United States Patent [19]
Shirasaki

[11] Patent Number: 5,535,000
[45] Date of Patent: Jul. 9, 1996

[54] OPTICAL INTERFEROMETER WITH SQUEEZED VACUUM AND REDUCED GUIDED-ACOUSTIC-WAVE BRILLOUIN SCATTERING NOISE

[76] Inventor: Masataka Shirasaki, 29 Foster Rd., Belmont, Mass. 02178

[21] Appl. No.: 211,906

[22] PCT Filed: Feb. 17, 1993

[86] PCT No.: PCT/US93/01421

§ 371 Date: Aug. 22, 1994

§ 102(e) Date: Aug. 22, 1994

[87] PCT Pub. No.: WO94/05967

PCT Pub. Date: Mar. 17, 1994

[30] Foreign Application Priority Data

Aug. 27, 1992 [GB] United Kingdom ............... 9218235

[51] Int. Cl.⁶ ............................................................ G01B 9/02
[52] U.S. Cl. ........................................... 356/345; 356/350
[58] Field of Search .................................... 356/345, 350; 250/227.19, 227.27; 385/12, 14

[56] References Cited

PUBLICATIONS

*Reduction of Guided–Acoustic–Wave Brillouin Scattering Noise in A Squeezer*, Shirasaki et al., Optics Letters, Sep. 1, 1992, vol. 17, No. 17, pp. 1225–1227.

*Squeezing of Pulses in a Nonlinear Interferometer*, Shirasaki and haus, J. Opt. Soc. of Am. B., vol. 7, No. 1, Jan. 1990 pp. 30–34.

*Squeezing in Fibers With Optical Pulses*, Bergman and Haus, Optics Letters, May 1, 1991, pp. 663–665.

Primary Examiner—Samuel A. Turner
Attorney, Agent, or Firm—Wolf, Greenfield & Sacks

[57] ABSTRACT

An interferometric measurement scheme utilizing squeezed light wherein an input pulse is split into two consecutive input pulses separated by a time interval that is less than the inverse spectral width of GAWBS. The two pulses are further split into first and second pairs of pulses and are caused to propagate in opposite directions through a fiber optic interferometer loop and are recombined upon exiting the loop. The recombined pulses are caused to pass through a π phase modulator which modulates one of the two pulses. The output is then introduced to a balanced detector where the detected signal of the two is averaged such that GAWBS noise is cancelled.

15 Claims, 3 Drawing Sheets

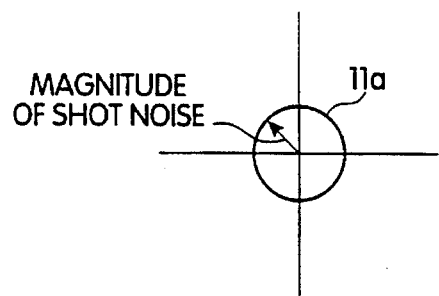
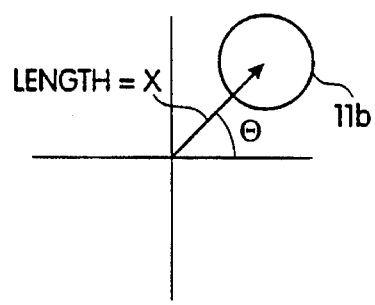
Fig. 1A          Fig. 1B
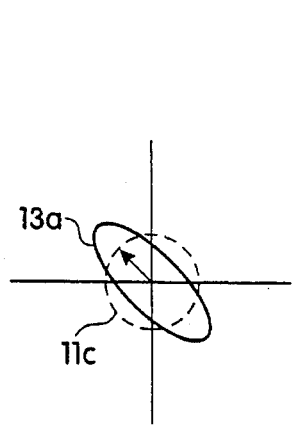
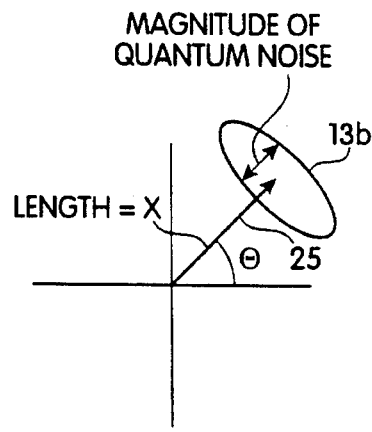
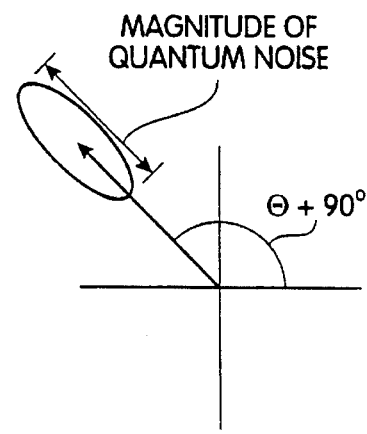
Fig. 2A          Fig. 2B          Fig. 2C

OPTICAL INTERFEROMETER WITH SQUEEZED VACUUM AND REDUCED GUIDED-ACOUSTIC-WAVE BRILLOUIN SCATTERING NOISE

FIELD OF THE INVENTION

This invention relates to fiber optics. More particularly, the invention relates to fiber optic interferometric detectors which employ light squeezing.

BACKGROUND OF THE INVENTION

Light of any nature, including continuous wave and pulsed light (hereinafter collectively referred to as light beams), comprises shot noise. Shot noise is quantum noise. Shot noise exists because the rate of photons in a light beam is not uniform but is random to a certain extent. The smallest increment with which the phase or amplitude of a light beam can be determined, i.e., the accuracy of phase or amplitude determination, is limited by shot noise. For example, in a fiber optic interferometer in which two light pulses are compared to each other by a balanced detector after they counter propagate through an optical fiber loop, the accuracy of the balanced detector in detecting a phase difference between the two pulses is limited by the shot noise of the system.

Optical squeezing is a method for reducing the effect of shot noise. When light is introduced into an optical fiber at very high intensity, i.e., on the order of 1 kilowatt or greater, the index of refraction of the fiber varies slightly for different intensities. This difference in index of refraction causes the speed at which photons of different intensities travel through the fiber to be different, resulting in relative phase shifts for light pulses of different intensity.

In an optical fiber in which squeezing is not occurring, the probable phase and amplitude of an intense light beam follows a generally gaussian distribution. The amplitude distribution of the vacuum state would be generally circular, as shown by circle 11a in the phasor diagram of FIG. 1A, and the field of the light could be anywhere within the circle. If the light had an amplitude of X and a phase of Θ then the phasor diagram would be as shown in FIG. 1B and the field of the light may be anywhere within circle 11b. However, in an optical fiber experiencing squeezing, the probable phase and amplitude of light is altered due to nonlinear light effects in the fiber.

The phasor diagram of a squeezed vacuum is elliptical, as shown at 13a in FIG. 2A. FIG. 2B illustrates the situation for squeezed light of amplitude X and phase Θ at 13b. The orientation of the major axis of the ellipse is a function of the phase shift. A light beam which has a phase Θ such that it is oriented generally parallel to the minor axis of the ellipse, such as vector 25 in FIG. 2B, has less quantum noise in the photon number than unsqueezed light, i.e., sub-shot noise. If, on the other hand, the phase of the light was oriented generally parallel to the major axis of the ellipse, as illustrated by vector 27 in FIG. 2C, that light would have more quantum noise in the photon number than unsqueezed light.

Reference can be made to Bergman, K. and Haus, H. A., *Squeezing in Fibers With Optical Pulses,* Optics Letters, vol. 15, No. 9, May 1, 1991, as well as Shirasaki, M. and Haus, H. A., *Squeezing of Pulses in a Non-Linear Interferometer,* J. Opt. Soc. Am., vol. 7, No. 1, January 1990 for more thorough discussions of squeezing in optical fibers.

Further, a type of interferometric detection scheme using squeezed light is suggested in Shirasaki, M. and Haus, H. A., *Non-Linear Guided-Wave Phenomena: Physics and Applications,* vol. 2, OSA Technical Digest Series (Optical Society of America, Washington, D.C., 1989), p. 232, and Shirasaki, M. and Haus H. A., Journal of the Optical Society of America, B7, 30 (1990).

Guided-acoustic-wave Briliouin scattering (GAWBS) noise is a noise imparted to a light beam by thermal vibration in an optical fiber. GAWBS generally occurs at very high frequencies, on the order of 20 MHz–1 GHz. The thermal vibration of GAWBS noise alters the index of refraction of the fiber. Light pulses in different parts of the fiber will be subject to different GAWBS noise and, therefore, different indices of refraction, thus introducing a phase shift between different pulses. In applications where the relative phase of two distinct light pulses is of significance, such as a fiber optic interferometer, GAWBS noise reduces phase shift measurement accuracy.

GAWBS noise is a significant problem in squeezing since the light must pass through an optical fiber loop in which GAWBS noise is present in order for squeezing to occur. As the length of the fiber increases, GAWBS noise also increases. Accordingly, it has been proposed to decrease GAWBS noise through use of a short fiber and extremely short pulses with high peak power. Shelby, R. M., Levenson, M. D. and Bayer, P. W., Phys. Rev. B. 31, 5244 (1985). Further, Sakai, Y., Hawkins, R. J. and Friberg, S. R., *Soliton-Collison Interferometer for the Quantum Nondemolition Measurement of Photon Number: Numerical Results,* Optics Letters, 15, 239 (1990) suggest reducing GAWBS noise in soliton-collision photon number measurements by spacing the probe soliton (which is collided with a signal soliton) within a time interval that is small compared with the inverse spectral width of the GAWBS noise of a reference soliton and interferometrically detecting the phase shift between the collided probe soliton and the uncollided reference soliton. Since the two solitons are spaced apart by an interval which is small compared with the inverse spectral width of GAWBS noise, both pulses experience the same GAWBS noise and, therefore, any phase shift caused by GAWBS noise shows up in both the probe and reference soliton and is, therefore, cancelled in the comparison.

It is an object of the present invention to reduce GAWBS noise in an optical squeezer.

It is a further object of the present invention to provide an optical interferometer utilizing squeezed light having reduced GAWBS noise.

SUMMARY OF THE INVENTION

The invention comprises a scheme for reducing GAWBS noise in squeezed light. An input pulse of light of sufficient magnitude for allowing squeezing to occur in a fiber is split into two consecutive pulses of equal intensity by a relative time delay circuit. The time interval between the two pulses is made to be less than the inverse spectral width of GAWBS noise so that the two pulses will experience the same GAWBS noise in the fiber. The two pulses are then split by a beam splitter/coupler so as to form first and second pairs of pulses which are introduced into opposite ends of a fiber optic loop and propagate in opposite directions therethrough. Upon reaching the opposite ends of the fiber optic loop, the four pulses are re-introduced to the beam splitter. The two pulse pairs are recombined by the beam splitter into a local oscillator pulse pair, comprising almost all of the power of the input light which exits from one port of the beam splitter and a squeezed vacuum pulse pair which exits from the other port.

The squeezed vacuum signal is passed through a π phase modulator which is temporally controlled to allow the first pulse to pass through unaffected and to shift the phase of the second pulse by π. The squeezed vacuum signal is then introduced to a first port of a beam splitter while the local oscillator is introduced to the other port. The output of the beam splitter comprises two beams of light, each comprising a mixture of the local oscillator and the squeezed vacuum signal. Each beam comprises two pulses which have opposite polarity for the squeezed vacuum signal due to the π phase modulator.

The beams outputted from the beam splitter can then be used in whatever manner desired. For instance, both beams can be input to an optical fiber interferometer. In such an application, the beams are eventually directed to a homodyne detector comprising a beam splitter and two detectors which are balanced relative to each other. The homodyne detector essentially outputs a signal having a magnitude proportional to the projection of the squeezed vacuum portion of the input light onto the local oscillator. The squeezed vacuum, however, comprises two pulses whose GAWBS noise are of equal magnitude but opposite polarity due to the π phase shift. Accordingly, the GAWBS noise can be eliminated by averaging the output of each of the two detectors over the combined period of the two pulses. Typically, the response time of the detection system is relatively slow compared to the pulses such that the two pulses of opposite polarity are automatically averaged during detection, thus eliminating GAWBS noise.

In a second embodiment of the invention, the structure remains the same except that the π phase modulator is not placed in the path of the squeezed vacuum signal but in the path of the local oscillator. Essentially the same result is achieved. In fact, it is preferable for the phase modulator to be placed in the path of the local oscillator because the degradation of the noise suppression is less sensitive to the loss of the local oscillator than it is to the squeezed vacuum signal.

BRIEF DESCRIPTION OF THE DRAWINGS

FIGS. 1A and 1B are a phasor diagram illustrating quantum noise in classical light.

FIGS. 2A-2C are phasor diagram illustrating quantum noise in squeezed light.

DETAILED DESCRIPTION OF THE PREFERRED EMBODIMENT OF THE INVENTION

Figure 3:
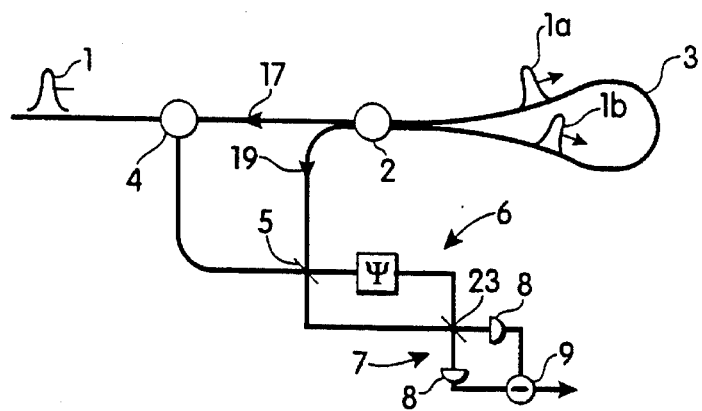
FIG. 3 is a schematic diagram of an interferometer that employs light squeezing to reduce quantum noise.

FIG. 3 is a schematic diagram of a prior art squeezer and interferometer combination. An input light pulse 1 of extremely high intensity (so as to cause squeezing in the fiber) is introduced to a fiber loop 3 through a 50/50 optical coupler 2, which may be a beam splitter, for example. The 50/50 coupler splits the input pulse 1 into two equal pulses 1a and 1b which are introduced into opposite ends of fiber 3 and propagate therethrough in opposite directions. Assuming that pulses 1a and 1b are of sufficient intensity so as to be squeezed in the fiber, when they are recombined by coupler 2 as they exit the opposite ends of the fiber 3, coupler 2 outputs two signals (one from each output port of the beam splitter). The output signal from the first port of the coupler, in the direction of arrowhead 17 in FIG. 3, comprises a pulse having almost all of the power of the recombined pulses 1a and 1b. This signal is referred to herein as the local oscillator signal. Optical circulator 4 separates the local oscillator signal from the input path and directs it towards a homodyne detector 7. The signal from the other output port of the coupler 2, in the direction of arrowhead 19, is termed the squeezed vacuum signal and comprises a pulse having an extremely small portion of the power of the recombined pulses 1a and 1b. Those skilled in the related arts will understand that the squeezed vacuum pulse simultaneously appears at the second output port of the coupler as a result of the non-linear effects in the fiber loop. Reference can be made to the above-identified articles, which are incorporated in this application as appendicies A and B, for a clearer understanding of the generation of the squeezed vacuum output. The power in the squeezed vacuum signal is so low that the squeezed vacuum essentially can be considered to comprise squeezed quantum noise with an amplitude of zero, as illustrated in FIG. 2A. The quantum noise, having traveled through the loop is squeezed (thus the term squeezed vacuum) and also now contains GAWBS noise. The local oscillator signal also comprises the same amount and character of squeezed quantum noise and GAWBS.

The squeezed vacuum signal is provided to one port of an input beam splitter 5 of interferometer 6 while the local oscillator signal is supplied to the other port of the beam splitter 5. The output of the beam splitter 23 of the interferometer 6 is coupled to a homodyne detector 7. The homodyne detector comprises two balanced detectors 8 and a subtractor 9 for determining the difference between the outputs of the two detectors 8. As is well known by those skilled in the art, the intensity and polarity in the output of the homodyne detector is a function of the difference in phase between the squeezed vacuum signal and the local oscillator. Any relative phase shift introduced into the signal by GAWBS noise will increase the output noise and reduce the accuracy of the phase shift detection.

Figure 4:
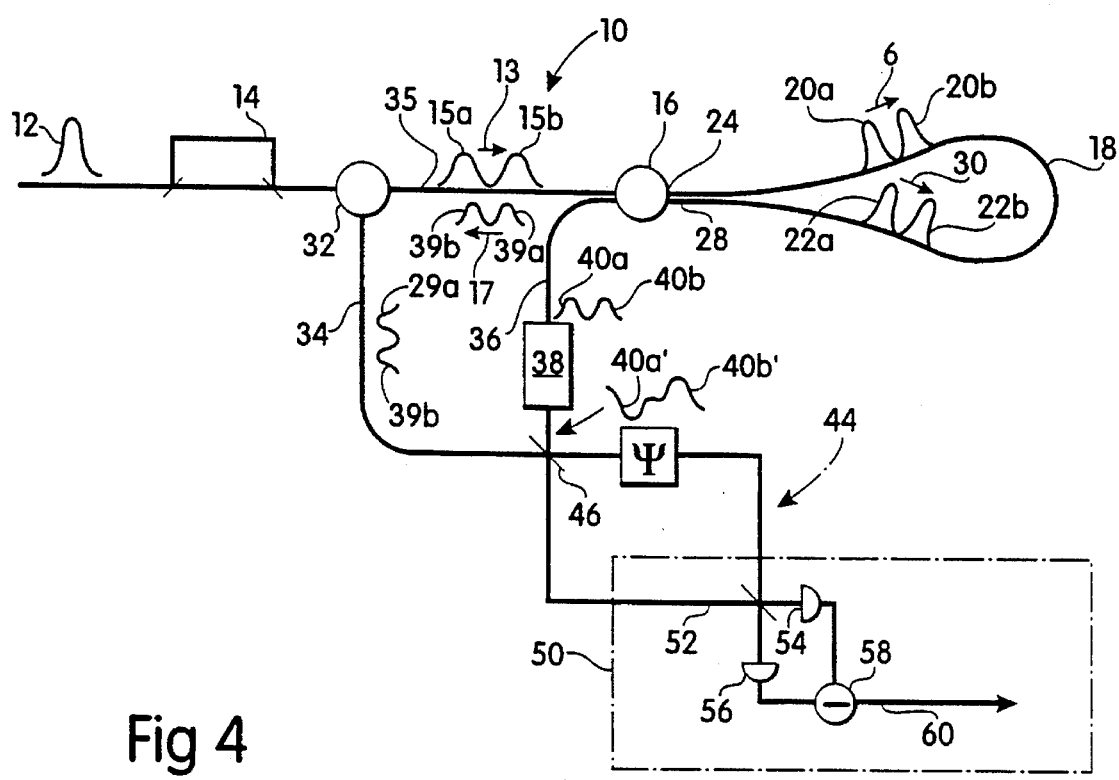
FIG. 4 is a schematic diagram of a first embodiment of the present invention.

FIG. 4 is a schematic diagram showing a fiber loop interferometer according to the present invention. In FIG. 4, an input light pulse 12 of extremely high intensity (so as to cause squeezing in the fiber) is introduced to a delay circuit 14 which splits the input light pulse into two pulses of equal intensity by dividing it in half and causing the two halves to pass over generally parallel paths of unequal length. This results in two consecutive pulses 15a and 15b having equal intensity with a relative time delay of t. The delay period t is less than the inverse spectral width of the GAWBS noise. Since the frequency of GAWBS noise is typically in the range of 20 MHz–1 GHz, the time delay t should be no greater than approximately 1 nanosecond.

The two pulses 15a and 15b are then coupled to a fiber optic loop by coupler 16. Coupler 16, which may be a beam splitter, splits each of pulses 15a and 15b into two sub-pulses of equal intensity and introduces them into opposite ends of fiber optic loop 18. Pulse 15a becomes sub-pulses 20a and 22a, while pulse 15b becomes sub-pulses 20b and 22b. Split pulses 20a and 20b enter the fiber optic loop at terminal 24 and travel around the loop in a clockwise direction indicated by arrow 26. Split pulses 22a and 22b enter the loop at terminal 28 and travel around the loop 18 in the counterclockwise direction as indicated by arrow 30. The two counter propagating sub-pulse pairs travel around the loop 18 in opposite directions.

When the sub-pulse pairs exit from the opposite ends of the fiber, they are recombined by coupler/beam splitter 16 to form a squeezed vacuum pulse pair 40a and 40b on path 36 out of one port of coupler 16 and a local oscillator pulse pair 39a and 39b on path 35 out of the other port of coupler 16 as previously described with respect to the prior art and FIG. 3. Local oscillator pulses 39a and 39b return along the input path 35 to optical circulator 32 where they are redirected along path 34 to one port of an input beam splitter 46 of an optical fiber ring interferometer 44.

The squeezed vacuum pulses 40a and 40b are forwarded to the other input port of beam splitter 46 of interferometer 44 along a different path, path 36 in which a $\pi$ phase modulator 38 is positioned.

The $\pi$ phase modulator 38 is interposed between the squeezed vacuum output (comprising pulses 40a and 40b) of the fiber optic loop 18 and the beam splitter 46 of interferometer 44. The modulator 38 may be a push-pull type continuous wave sinusoidal modulator driven to modulate with a period of 2t, where t is the time period between the pulses. The modulator oscillates between providing a phase shift to light passing through it of 0 and $\pi$. Modulator 38 may be an electro-optic crystal having a voltage source coupled across it. The oscillator switches between a first voltage, which will cause the crystal to impart a zero phase shift to light traveling through it and a second voltage, which will cause the crystal to impart a $\pi$ phase shift to the light traveling through it. The voltage source cycle period is equal to twice the time period between the pulses, t. In at least one embodiment of the invention, the modulator is triggered by the leading edge of the first pulse. In this manner, the first pulse passes through the crystal while the voltage source is providing the first voltage, but by the time the second pulse reaches the crystal, the voltage source has switched to the second voltage.

Accordingly, modulator 38 inverts one of pulses 40a and 40b and does not affect the other, as shown by output pulses 40a' and 40b' from modulator 38 shown in FIG. 4.

A homodyne detector 50, comprising a beam splitter 52, two balanced detectors 54 and 56 and a subtractor 58, receives the output signals of interferometer 44.

The purpose served by the $\pi$ phase modulator will now be explained. When beams 20a, 20b, 22a and 22b first enter loop 18, they all have identical properties. However, after exiting from loop 18, beams 20a and 20b have different phase properties than beams 22a and 22b due to GAWBS noise. Due to the fact that the relative time delay, t, between pulses 20a and 20b and between pulses 22a and 22b are less than the inverse spectral width of GAWBS noise, pulses 20a and 20b experience identical GAWBS noise in fiber 18. Beams 22a and 22b also experience identical GAWBS noise to each other in fiber 18. However, as previously noted, pulses 20a and 20b experience a different GAWBS noise than pulses 22a and 22b.

Accordingly, there will be a GAWBS-induced phase shift between the two pulse pairs in fiber loop 18, homodyne detector 50 will not have a zero output. Accordingly, the output 60 of homodyne detector 50 will not be zero even if there is no phase shift in interferometer 44. Thus it can be seen that GAWBS noise reduces the accuracy of detection of phase changes in interferometer 44 by the magnitude of the GAWBS noise imparted to the pulses in squeezing fiber loop 18.

Phase modulator 38, however, creates an effect whereby GAWBS noise is eliminated as explained hereinbelow. Recombined pulse 40b of the squeezed vacuum includes the GAWBS noise characteristics of both pulses 20b and 22b. Similarly, pulse 40a contains the GAWBS noise characteristics of both pulses 20a and 22a. As noted above, however, leading pulse 20b has the same GAWBS noise characteristics as trailing pulse 20a and leading pulse 22b has the same GAWBS noise characteristics as trailing pulse 22a. It should now be clear that pulse 40a and pulse 40b each contain identical GAWBS noise characteristics, i.e., pulse 40a contains the combined GAWBS noise characteristics of pulses 20a and 22a while pulse 40b contains the combined GAWBS noise characteristics of pulses 20b and 22b. Pulses 39a and 39b also comprise identical GAWBS noise to each other. Thus, after passing through modulator 38, in which one of pulses 40a and 40b is inverted, pulse 40a' will contain GAWBS noise which is the exact inverse of the GAWBS noise contained in pulse 40b'.

When the pulses eventually reach homodyne detector 50, pulses 40a' and 40b' will automatically be averaged assuming that the response time of the homodyne detector is too slow to distinguish between pulses 40a and 40b (as would be expected from typical commercially available optical homodyne detectors). As is well known, the homodyne detector outputs a signal, the magnitude of which is a function of the difference in magnitude of the two signals input to the detector, i.e., the difference in the magnitude of the signal detected by detector 54 and the signal detected by detector 56. As shown below, in the situation where there is no phase shift in the interferometer 44, the output of the homodyne detector is dictated by the projection of the squeezed vacuum signal onto the axis of the local oscillator.

Accordingly, we will first consider the situation where the squeezed vacuum and local oscillator are applied directly to the balanced detector, i.e., we will assume that interferometer 44 is eliminated and that pulses 39a, 39b, 40a and 40b are applied directly to beam splitter 52. If A is the amplitude of the squeezed vacuum signal and B is the amplitude of the local oscillator, then the output 52a of the beam splitter is:

$$\frac{A+B}{\sqrt{2}} \qquad \text{(Eq. 1)}$$

while the output 52b of beam splitter 52 is:

$$\frac{A-B}{\sqrt{2}} \qquad \text{(Eq. 2)}$$

The optical intensity detected by the first detector 54 is, therefore:

$$\frac{A^*+B^*}{\sqrt{2}} \frac{A+B}{\sqrt{2}} \qquad \text{(Eq. 3)}$$

where * denotes the conjugate mathematical function.

The optical intensity detected by detector 56 is given by:

$$\frac{A^*-B^*}{\sqrt{2}} \frac{A-B}{\sqrt{2}} \qquad \text{(Eq. 4)}$$

The subtractor 58 of the homodyne detector essentially subtracts equation 4 from equation 3, which results in:

$$A^*B + AB^* \qquad \text{(Eq. 5)}$$

Equation 5 essentially expresses that the output of the homodyne detector is the projection of the squeezed vacuum signal, A, onto the axis of the local oscillator, B.

Figure 5:
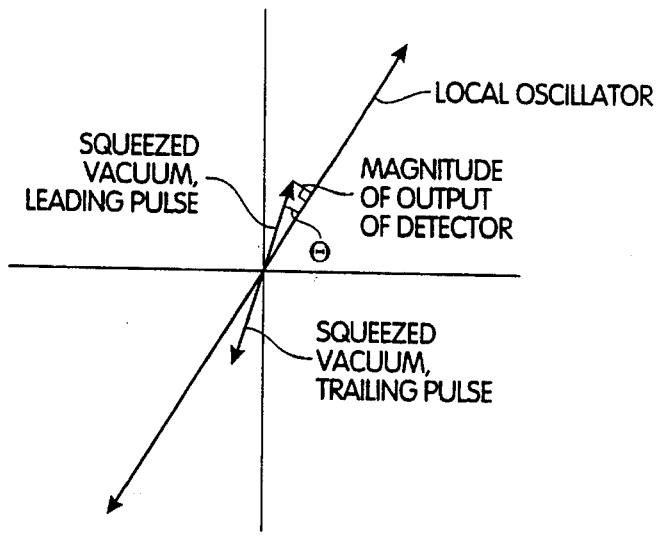
FIG. 5 is a phasor diagram illustrating the phasor vectors of various light beams in the present invention.

FIG. 5 illustrates this relationship. The output of the homodyne detector is essentially given by |A||B|cosΘ, where |A| is the magnitude of the squeezed vacuum and Θ is the angle between the phase of the squeezed vacuum and the local oscillator (see FIG. 5). If there was no relative phase shift between the pulse pair outputs of splitter 46 in the interferometer 44, then the squeezed vacuum portion of the two signal inputs to the homodyne detector comprises two equal pulses of opposite polarity while the local oscillator portion of the two inputs are equal. Accordingly, the projection of the first squeezed vacuum pulse onto the local oscillator will be exactly equal and opposite to the projection of the second squeezed vacuum pulse onto the local oscillator as shown in FIG. 5. The average of the two pulses will be zero as illustrated in FIG. 5. Thus, in the present invention, the output 60 of the balanced detector 50 will be insensitive to GAWBS noise and will only detect relative phase shift which occurred in interferometer 44. Of course, any phase shift occurring after beam splitter 46 is not cancelled and will show up in the output of the homodyne detector.

We will now consider the situation in which interferometer 44 is in the system, as shown in FIG. 4. It will be shown that the GAWBS noise created in loop 18 is still averaged and cancelled by balanced detector 50, but that any phase shift which occurred in interferometer 44 is preserved. A simple example of a situation in which a $\pi/2$ phase shift occurs in the interferometer will be considered. In this case, the first and second inputs to beam splitter 52 are no longer the squeezed vacuum and the local oscillator, respectively. Instead, they are $$\frac{A+iB}{\sqrt{2}} \text{ and } i \cdot \frac{A-iB}{\sqrt{2}},$$

respectively, as a result of the mixing of the signals caused by beam splitter 46 of the interferometer 44, where $i$ denotes the $\pi/2$ phase shift (i.e., the imaginary axis). Accordingly, the output 52a of beam splitter 52 is given by:

$$\frac{\frac{A+iB}{\sqrt{2}} + i\frac{A-iB}{\sqrt{2}}}{\sqrt{2}} \quad \text{(Eq. 6)}$$

The output 52b of beam splitter 52 is given by:

$$\frac{\frac{A+iB}{\sqrt{2}} - i\frac{A-iB}{\sqrt{2}}}{\sqrt{2}} \quad \text{(Eq. 7)}$$

The optical intensity detected by the first detector 54 is, therefore:

$$\frac{(1+i)(1-i)(A^*A + B^*B + AB^* + A^*B)}{4} \quad \text{(Eq. 8)}$$

while the optical intensity detected by detector 56 is:

$$\frac{(1+i)(1-i)(AA^* + BB^* - AB^* - A^*B)}{4} \quad \text{(Eq. 9)}$$

The subtractor 58 of the homodyne detector subtracts equation 9 from equation 8, which results in:

$$AB^* + A^*B \quad \text{(Eq. 10)}$$

which is identical to equation 5, i.e., the projection of vector A onto vector B.

Figure 6:
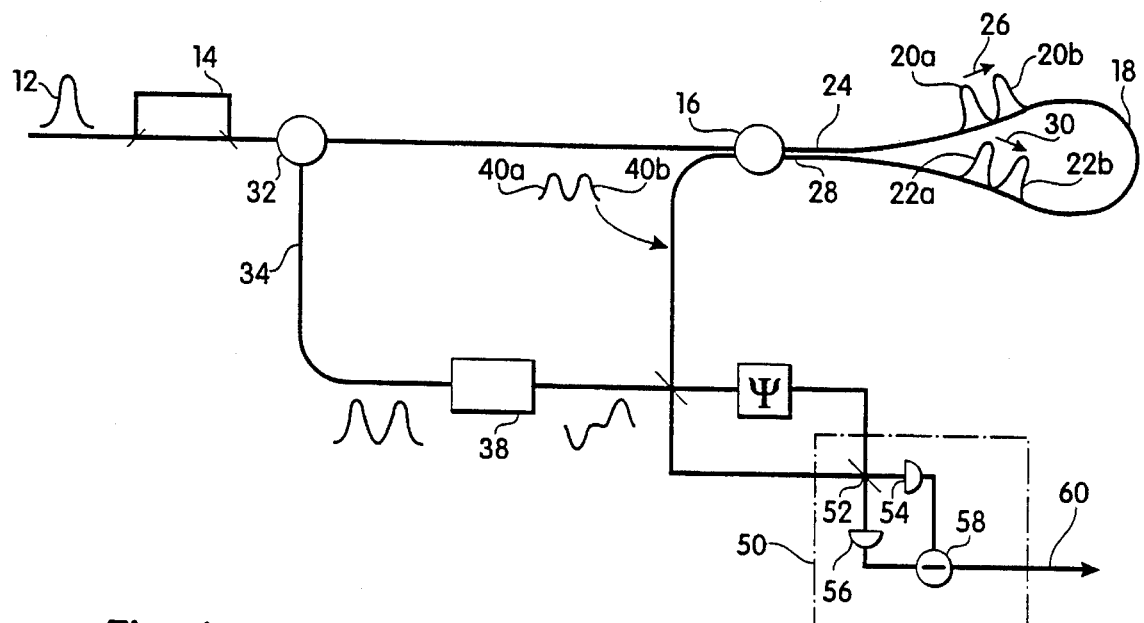
FIG. 6 is a schematic diagram of a second embodiment of the present invention.

FIG. 6 is a schematic diagram of a second embodiment of the present invention, with like elements being provided with the same reference numerals as in the FIG. 4 embodiment. The embodiment of the invention shown in FIG. 6 is essentially identical to the embodiment of FIG. 4 except that the π phase modulator 38 is placed in the path 34 of the local oscillator signal rather than squeezed vacuum path 36. Both embodiments of the invention will give essentially the same output noise when the modulator has no loss. However, in actuality, all modulators will experience some loss which will degrade the suppression of shot noise, i.e. will cause the ellipse of FIG. 2 to degrade to a more circular shape. The FIG. 6 embodiment of the invention is preferable because the degradation of the elliptical shape of the quantum noise is essentially negligible on the local oscillator because of the much greater magnitude of the local oscillator signal relative to the quantum noise.

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for interferometrically detecting phase shift between two light beams in which the effect of GAWBS noise is reduced, said method comprising the steps of;

(1) generating first and second initial optical pulses of equal amplitude and phase, said first and second initial pulses separated in time by a period less than the inverse spectral width of GAWBS noise, (2) splitting each of said pulses into first and second sub-pulses so as to form first and second pairs of sub-pulses, each of said sub-pulses of an amplitude sufficient to cause an optical fiber to exhibit non-linear refractive properties, (3) introducing said first pair of sub-pulses into a first end of an optical fiber loop such that said pulses travel through said loop in a first direction, (4) introducing said second pair of sub-pulses into a second end of said optical fiber loop such that said pulses travel through said loop in a second direction, (5) combining said first pair of sub-pulses and said second pair of sub-pulses of signals after traveling through said loop such that a local oscillator signal comprising first and second pulses and a squeezed vacuum signal also comprising first and second pulses are produced, (6) phase shifting one of said first and second pulses of one of said local oscillator and said squeezed vacuum signals by one-half of a wavelength, (7) interferometrically detecting relative phase shift between said pulses in a detector which has a response time greater than the inverse spectral width of GAWBS noise.

2. A method as set forth in claim 1 wherein said interferometric detecting step comprises;

(7.1) introducing said local oscillator signal to a first port of a beam splitter and introducing said squeezed vacuum signal to a second port of said beam splitter, whereby said beam splitter outputs first and second pairs of measurement pulses, and (7.2) introducing said first and second pairs of measurement pulses to first and second balanced detectors, said detectors having a response time greater than the inverse spectral width of said GAWBS noise.

3. A method for producing squeezed optical signals having reduced GAWBS noise comprising the steps of:

(1) generating first and second initial optical pulses of equal amplitude and phase, said first and second initial pulses separated in time by a period less than the inverse spectral width of said GAWBS noise, (2) splitting each of said pulses into first and second sub-pulses so as to form first and second pairs of sub-pulses, each of said sub-pulses of an amplitude sufficient to cause an optical fiber to exhibit non-linear refraction properties, (3) introducing said first pair of sub-pulses into a first end of an optical fiber loop such that said pulses travel through said loop in a first direction, (4) introducing said second pair of sub-pulses into a second end of said optical fiber loop such that said pulses travel through said loop in a second direction, (5) combining said first pair of sub-pulses and said second pair of sub-pulses of signals after traveling through said loop such that a local oscillator signal comprising first and second pulses and a squeezed vacuum signal also comprising first and second pulses are produced, (6) phase shifting one of said first and second pulses of one of said local oscillator and said squeezed vacuum signals by one-half of a wavelength, (7) introducing said local oscillator signal to a first port of a beam splitter and introducing said squeezed vacuum signal to a second port of said beam splitter, whereby said beam splitter outputs first and second pairs of primary measurement pulses, and (8) introducing said first and second pairs of measurement pulses into an interferometer, said interferometer having first and second outputs containing phase shift information, (9) introducing said first output of said interferometric detector to a first port of a beam splitter and introducing said second output of said interferometric detector to a second port of said beam splitter, whereby said beam splitter outputs first and second pairs of secondary measurement pulses, and

(10) introducing said first and second pairs of secondary measurement pulses to first and second detectors, respectively, of a homodyne detector, said homodyne detector having a response time greater than the inverse spectral width of said GAWBS noise.

4. An apparatus for interferometrically detecting phase shift between two light beams in which the effect of GAWBS noise generated in an optical fiber is reduced, comprising;

means for generating first and second initial optical pulses of equal amplitude and phase, said first and second initial pulses separated in time by a period less than the inverse spectral width of said GAWBS noise, an optical fiber loop having first and second ends, a first beam splitter for splitting said first and second pulses into first and second pairs of sub-pulses, each sub-pulse having an amplitude sufficient to cause an optical fiber to exhibit non-linear refractive properties, said beam splitter positioned to introduce said first pair of sub-pulses into said first end of said optical fiber loop such that said first pair of sub-pulses travel through said loop in a first direction and said second pair of sub-pulses into said second end of said optical fiber loop such that said second pair of sub-pulses travel through said loop in a second direction, and said first pair of sub-pulses and said second pair of sub-pulses are re-introduced into said beam splitter after traveling through said loop, whereby a local oscillator signal and a squeezed vacuum signal, each comprising first and second pulses, are produced, and a half-wave phase modulator for phase shifting one of said first and second pulses of one of said local oscillator and said squeezed vacuum signals, a second beam splitter positioned to receive said local oscillator signal at a first port thereof and said squeezed vacuum signal at a second port thereof and to output first and second pairs of initial measurement pulses out of first and second output ports of said beam splitter, respectively, and a homodyne detector positioned to receive said first and second initial measurement signals at first and second input ports thereto and having an output indicative of phase shift between said first and second pairs of measurement pulses, said homodyne detector having a response time greater than the inverse spectral width of GAWBS noise.

5. An apparatus as set forth in claim 4 wherein said means for generating said first and second initial optical pulses comprises a light source and a relative time delay circuit.

6. An apparatus as set forth in claim 5 further comprising;

a circulator placed in the path of said local oscillator signal so as to redirect said local oscillator signal to meet with said squeezed vacuum signal at said second beam splitter.

7. An apparatus as set forth in claim 4 wherein said homodyne detector comprises first and second balanced photodetectors and means for subtracting the output of said first photodetector from the output of said second photodetector.

8. An apparatus as set forth in claim 7 further comprising an interferometer interposed between said second beam splitter and said homodyne detector.

9. An apparatus as set forth in claim 4 wherein said homodyne detector comprises a third beam splitter, first and second balanced photodetectors and means for subtracting the output of said first photodetector from the output of said second photodetector.

10. An apparatus as set forth in claim 4 wherein said half wave phase modulator is positioned in the path of said local oscillator signal so as to shift one of said pulses of said local oscillator pulse pair.

11. An apparatus as set forth in claim 4 wherein said half wave phase modulator is positioned in the path of said squeezed vacuum signal so as to shift one of said pulses of said squeezed vacuum pulse pair.

12. An apparatus for interferometrically measuring relative phase shift between two signals in which the effect of GAWBS noise on said measurement of relative phase shift is reduced, said apparatus comprising;

a light source for generating a pulse of coherent light, a relative time delay circuit for splitting said pulse into first and second initial optical pulses of equal amplitude and phase, said first and second initial pulses separated in time by a period less than the inverse spectral width of GAWBS noise, an optical fiber loop having first and second ends, a first beam splitter for splitting said first and second pulses into first and second pairs of sub-pulses, each sub-pulse having an amplitude sufficient to cause an optical fiber to exhibit non-linear refractive properties, said beam splitter positioned to introduce said first pair of sub-pulses into said first end of said optical fiber loop such that said first pair of sub-pulses travel through said loop in a first direction and said second pair of sub-pulses into said second end of said optical fiber loop such that said second pair of sub-pulses travel through said loop in a second direction, and said first pair of sub-pulses and said second pair of sub-pulses are re-introduced into said beam splitter after traveling through said loop, whereby a local oscillator signal and a squeezed vacuum signal, each comprising first and second pulses, are produced, a circulator placed in the path of said local oscillator signal so as to redirect said local oscillator signal to meet with said squeezed vacuum signal at a predetermined position, a half-wave phase modulator interposed in the path of said local oscillator signal for phase shifting one of said first and second pulses of said local oscillator signal, a second beam splitter positioned at said predetermined position to receive said local oscillator signal at a first port thereof and said squeezed vacuum signal at a second port thereof and to output first and second pairs of measurement pulses out of first and second output ports of said second beam splitter, respectively, an interferometer positioned to receive said first and second initial measurement signals and outputting first and second primary measurement signals, and a homodyne detector for receiving said first and second pairs of measurement pulses, said homodyne detector having a response time greater than the time delay between said first and second initial optical pulses such that each of said pairs of measurement pulses is averaged such that said GAWBS noise is cancelled.

13. An apparatus as set forth in claim 12 wherein said homodyne detector comprises a third beam splitter, first and second balanced detectors and means for subtracting the output of said first balanced detector from the output of said second balanced detector.

14. An apparatus for interferometrically measuring relative phase shift between two signals in which the effect of GAWBS noise on said measurement of relative phase shift is reduced, said apparatus comprising;

a light source for generating a pulse of coherent light, a relative time delay circuit for splitting said pulse into first and second initial optical pulses of equal amplitude and phase, said first and second initial pulses separated in time by a period less than the inverse spectral width of GAWBS noise, an optical fiber loop having first and second ends, a first beam splitter for splitting said first and second pulses into first and second pairs of sub-pulses, each sub-pulse having an amplitude sufficient to cause an optical fiber to exhibit non-linear refractive properties, said beam splitter positioned to introduce said first pair of sub-pulses into said first end of said optical fiber loop such that said first pair of sub-pulses travel through said loop in a first direction and said second pair of sub-pulses into said second end of said optical fiber loop such that said second pair of sub-pulses travel through said loop in a second direction, and said first pair of sub-pulses and said second pair of sub-pulses are re-introduced into said beam splitter after traveling through said loop, whereby a local oscillator signal and a squeezed vacuum signal, each comprising first and second pulses, are produced, a circulator placed in the path of said local oscillator signal so as to redirect said local oscillator signal to meet with said squeezed vacuum signal at a predetermined position, a half-wave phase modulator interposed in the path of said squeezed vacuum signal for phase shifting one of said first and second pulses of said squeezed vacuum signal, a second beam splitter positioned at said predetermined position to receive said local oscillator signal at a first port thereof and said squeezed vacuum signal at a second port thereof and to output first and second pairs of initial measurement pulses out of first and second output ports of said second beam splitter, an interferometer positioned to receive said first and second initial measurement signals and outputting first and second primary measurement signals, and a homodyne detector for receiving said first and second pairs of measurement pulses, said homodyne detector having a response time greater than the time delay between said first and second initial optical pulses such that each of said pairs of measurement pulses is averaged such that said GAWBS noise is cancelled.

15. An apparatus as set forth in claim 14 wherein said homodyne detector comprises a third beam splitter, first and second balanced detectors and means for subtracting the output of said first balanced detector from the output of said second balanced detector.

* * * * *